(12) United States Patent
Wang et al.

(10) Patent No.: US 12,517,932 B2
(45) Date of Patent: Jan. 6, 2026

(54) METHOD AND APPARATUS FOR PROCESSING INFORMATION

(71) Applicant: Jingdong Technology Holding Co., Ltd., Beijing (CN)

(72) Inventors: Hui Wang, Beijing (CN); Nan Xiao, Beijing (CN)

(73) Assignee: Jingdong Technology Holding Co., Ltd., Beijing (CN)

( * ) Notice: Subject to any disclaimer, the term of this patent is extended or adjusted under 35 U.S.C. 154(b) by 116 days.

(21) Appl. No.: 17/767,262

(22) PCT Filed: Apr. 30, 2020

(86) PCT No.: PCT/CN2020/088369
§ 371 (c)(1),
(2) Date: Apr. 7, 2022

(87) PCT Pub. No.: WO2021/068493
PCT Pub. Date: Apr. 15, 2021

(65) Prior Publication Data
US 2022/0391425 A1 Dec. 8, 2022

(30) Foreign Application Priority Data
Oct. 11, 2019 (CN) .......................... 201910963496.5

(51) Int. Cl.
*G06F 16/00* (2019.01)
*G06F 16/3329* (2025.01)
(Continued)

(52) U.S. Cl.
CPC ........ *G06F 16/3329* (2019.01); *G06F 16/332* (2019.01); *G06F 16/355* (2019.01); *G06F 16/367* (2019.01)

(58) Field of Classification Search
CPC .. G06F 16/3329; G06F 16/367; G06F 16/355; G06F 16/332
(Continued)

(56) References Cited

U.S. PATENT DOCUMENTS

| | | | |
|---|---|---|---|
| 11,144,602 B2 * | 10/2021 | Katz | ................. G06F 16/24522 |
| 2012/0065963 A1 | 3/2012 | Bangalore et al. | |
| 2013/0232204 A1 * | 9/2013 | Barney | ................... H04L 51/02 |
| | | | 709/206 |
| 2019/0065600 A1 | 2/2019 | Katz et al. | |
| 2019/0121923 A1 * | 4/2019 | Ringgenberg | .......... G06F 17/40 |
| 2019/0236466 A1 * | 8/2019 | Harrison | ................ G06N 5/043 |

FOREIGN PATENT DOCUMENTS

| | | | | |
|---|---|---|---|---|
| CN | 108076055 A | * | 5/2018 | .......... H04L 5/1006 |
| CN | 109344242 A | | 2/2019 | |

(Continued)

OTHER PUBLICATIONS

Zhao et al., machine translated CN 1100836993A, Aug. 2, 2019, 23 pages.*

(Continued)

*Primary Examiner* — Monica M Pyo
(74) *Attorney, Agent, or Firm* — Buchanan Ingersoll & Rooney PC (57) ABSTRACT

A method and an apparatus for processing information. The method comprises: in response to reception of dialogue information inputted by a user, determining whether the user corresponds to historical reply information; in response to the user corresponding to the historical reply information, on the basis of the received dialogue information and the historical reply information corresponding to user, determining whether a preset dialogue information set includes target dialogue information corresponding to the user, the preset dialogue information corresponding to preset reply information and preset historical reply information, the target dialogue information being preset dialogue information which matches the received dialogue information and of which the corresponding preset historical reply information matches (Continued)

the historical reply information corresponding to the user; and in response to the preset dialogue information set including the target dialogue information, sending to the user the preset reply information corresponding to the included target dialogue information.

17 Claims, 6 Drawing Sheets

(51) Int. Cl.
 *G06F 16/332* (2019.01)
 *G06F 16/355* (2025.01)
 *G06F 16/36* (2019.01)
(58) Field of Classification Search
 USPC .......................................................... 707/768
 See application file for complete search history.

(56) References Cited

FOREIGN PATENT DOCUMENTS

| | | | |
|---|---|---|---|
| CN | 110019742 | A | 7/2019 |
| CN | 110083693 | A | 8/2019 |
| CN | 110222159 | A | 9/2019 |
| CN | 110263131 | A * | 9/2019 |
| CN | 110309275 | A | 10/2019 |
| CN | 110309283 | A | 10/2019 |
| CN | 110727775 | A | 1/2020 |

OTHER PUBLICATIONS

Chinese Office Action for Chinese Application No. 201910963496.5, dated Oct. 12, 2020, 10 pages.
International Search Report and Written Opinion for International Application No. PCT/CN2020/088369, dated Jul. 30, 2020, 8 pages.

* cited by examiner

METHOD AND APPARATUS FOR PROCESSING INFORMATION

This patent application is a U.S. national stage application of International Application No. PCT/CN2020/088369, filed on Apr. 30, 2020, which claims the priority from Chinese Patent Application No. 201910963496.5, filed on Oct. 11, 2019 by Jingdong Digits Technology Holdings Co., Ltd., entitled "Method and Apparatus for Processing Information," the contents of each of which are hereby incorporated by reference in their entireties.

TECHNICAL FIELD

Embodiments of the present disclosure relate to the field of computer technology, and specifically to a method and apparatus for processing information.

BACKGROUND

Human-machine dialogue is a sub-direction in the field of artificial intelligence. In layman's terms, through the human-machine dialogue, people can interact with a machine through a human language (i.e., natural language). As one of the problems of artificial intelligence, a complete human-machine dialogue system involves a wide range of technologies, for example, a voice processing technology, a natural language processing technology and a machine learning technology.

SUMMARY

Embodiments of the present disclosure propose a method and apparatus for processing information.

In a first aspect, an embodiment of the present disclosure provides a method for processing information, including: determining, in response to receiving dialogue information inputted by a user, whether the user corresponds to historical reply information, the historical reply information referring to a historical reply to historical dialogue information of the user; determining, based on the received dialogue information and the historical reply information corresponding to the user, whether a preset dialogue information set includes target dialogue information corresponding to the user, in response to determining that the user corresponds to the historical reply information, where preset dialogue information corresponds to preset reply information and preset historical reply information, the preset reply information is used to reply to the corresponding preset dialogue information, the preset historical reply information is used to reply to historical dialogue information relative to the corresponding preset dialogue information, and the target dialogue information is preset dialogue information which matches the received dialogue information and of which corresponding preset historical reply information matches the historical reply information corresponding to the user; and sending, in response to the preset dialogue information set including the target dialogue information, preset reply information corresponding to the included target dialogue information to the user.

In some embodiments, the determining, based on the received dialogue information and the historical reply information corresponding to the user, whether a preset dialogue information set includes target dialogue information corresponding to the user includes: determining whether the preset dialogue information set includes candidate dialogue information matching the received dialogue information; and determining, in response to that the preset dialogue information set includes the candidate dialogue information matching the received dialogue information, whether the included candidate dialogue information includes the target dialogue information of which the corresponding preset historical reply information matches the historical reply information corresponding to the user.

In some embodiments, the preset dialogue information set includes preset numerical range dialogue information, the preset numerical range dialogue information is used to indicate a numerical range, preset historical reply information corresponding to the preset numerical range dialogue information corresponds to at least two preset numerical ranges, and the numerical range indicated by the preset numerical range dialogue information belongs to the at least two numerical ranges corresponding to the corresponding preset historical reply information. The determining, based on the received dialogue information and the historical reply information corresponding to the user, whether a preset dialogue information set includes target dialogue information corresponding to the user includes: determining whether the received dialogue information indicates a numerical value; determining, in response to the received dialogue information indicating the numerical value, whether the historical reply information corresponding to the user corresponds to the at least two preset numerical ranges; determining, in response to the historical reply information corresponding to the at least two preset numerical ranges, a numerical range to which the numerical value indicated by the received dialogue information belongs from the at least two numerical ranges corresponding to the historical reply information corresponding to the user, for use as a target numerical range; determining whether the preset numerical range dialogue information included in the preset dialogue information set includes candidate dialogue information of which an indicated numerical range matches the target numerical range; and determining, in response to that the preset numerical range dialogue information included in the preset dialogue information set includes the candidate dialogue information of which the indicated numerical range matches the target numerical range, whether the included candidate dialogue information includes the target dialogue information of which the corresponding preset historical reply information matches the historical reply information corresponding to the user.

In some embodiments, the method further includes: sending, in response to that the preset dialogue information set does not include the target dialogue information corresponding to the user, preset general reply information to the user.

In some embodiments, the sending, in response to the preset dialogue information set including the target dialogue information corresponding to the user, preset reply information corresponding to the included target dialogue information to the user includes: sending, in response to the preset dialogue information set including at least two pieces of target dialogue information corresponding to the user, preset reply information corresponding to target dialogue information most matching the received dialogue information in the included at least two pieces of target dialogue information to the user.

In some embodiments, the method further includes: determining, in response to determining that the user does not correspond to the historical reply information, whether the preset dialogue information set includes the candidate dialogue information matching the received dialogue information, and sending, in response to the preset dialogue information set including candidate dialogue information corresponding to the user, preset reply information corresponding to the included candidate dialogue information to the user.

In some embodiments, the historical reply information is a historical reply to a previous round of historical dialogue information relative to a current round of dialogue information In a second aspect, an embodiment of the present disclosure provides an apparatus for processing information, including: a first determining unit, configured to determine, in response to receiving dialogue information inputted by a user, whether the user corresponds to historical reply information, the historical reply information referring to a historical reply to historical dialogue information of the user; a second determining unit, configured to determine, based on the received dialogue information and the historical reply information corresponding to the user, whether a preset dialogue information set includes target dialogue information corresponding to the user, in response to determining that the user corresponds to the historical reply information, where preset dialogue information corresponds to preset reply information and preset historical reply information, the preset reply information is used to reply to the corresponding preset dialogue information, the preset historical reply information is used to reply to historical dialogue information relative to the corresponding preset dialogue information, and the target dialogue information is preset dialogue information which matches the received dialogue information and of which corresponding preset historical reply information matches the historical reply information corresponding to the user; and a first sending unit, configured to send, in response to the preset dialogue information set including the target dialogue information, preset reply information corresponding to the included target dialogue information to the user.

In a third aspect, an embodiment of the present disclosure provides an electronic device, including: one or more processors; and a storage apparatus, configured to store one or more programs. The one or more programs, when executed by the one or more processors, cause the one or more processors to implement the method according to any embodiment of the method for processing information.

In a fourth aspect, an embodiment of the present disclosure provides a computer readable medium, storing a computer program. The program, when executed by a processor, implements the method according to any embodiment of the method for processing information.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
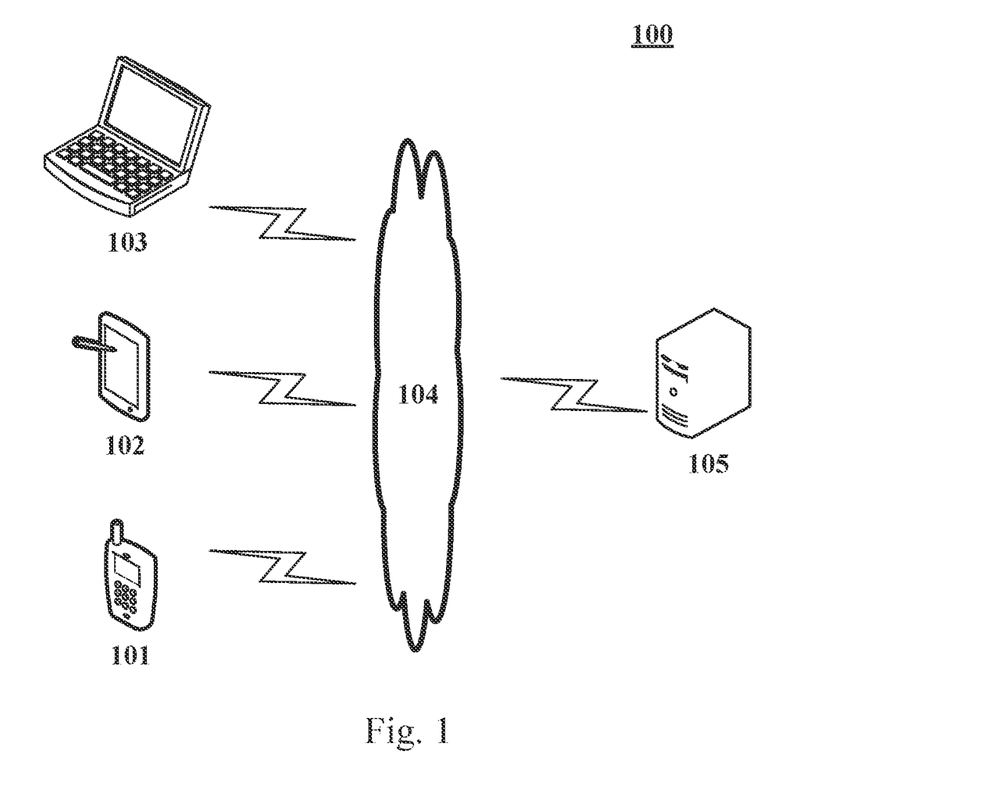
FIG. 1 is a diagram of an exemplary system architecture in which an embodiment of the present disclosure may be applied.

FIG. 1 illustrates an exemplary system architecture 100 in which embodiments of a method for processing information or an apparatus for processing information according to the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send a message, etc. Various communication client applications (e.g., a webpage browser application, a shopping application, a search application, an instant communication tool, a mailbox client and social platform software) may be installed on the terminal devices 101, 102 and 103.

The terminal devices 101, 102 and 103 may be hardware or software. When the terminal devices 101, 102 and 103 are the hardware, they may be various electronic devices having a information processing function, the electronic devices including, but not limited to, a smartphone, a tablet computer, an e-book reader, an MP3 player (Moving Picture Experts Group Audio Layer III), an MP4 (Moving Picture Experts Group Audio Layer IV) player, a laptop portable computer, a desktop computer, etc. When the terminal devices 101, 102 and 103 are the software, they may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, an information processing server processing dialogue information sent by the terminal devices 101, 102 and 103. Here, the dialogue information sent by the terminal devices 101, 102 and 103 may be the dialogue information inputted by the user on the terminal devices 101, 102 and 103. The information processing server may perform processing such as an analysis on the received data such as the dialogue information, to obtain a processing result (e.g., preset reply information corresponding to target dialogue information), and the information processing server may further feed back the processing result to the terminal devices, such that the terminal devices feed back the processing result to the user.

It should be noted that the method for processing information provided by the embodiments of the present disclosure may be performed by the terminal devices 101, 102 and 103, or performed by the server 105. Correspondingly, the apparatus for processing information may be provided in the terminal devices 101, 102 and 103, or provided in the server 105.

It should be noted that the server may be hardware or software. When the server is the hardware, the server may be implemented as a distributed server cluster composed of a plurality of servers, or as a single server. When the server is the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks and the servers in FIG. 1 are merely illustrative. Any number of terminal devices, networks and servers may be provided based on actual requirements.

Figure 2:
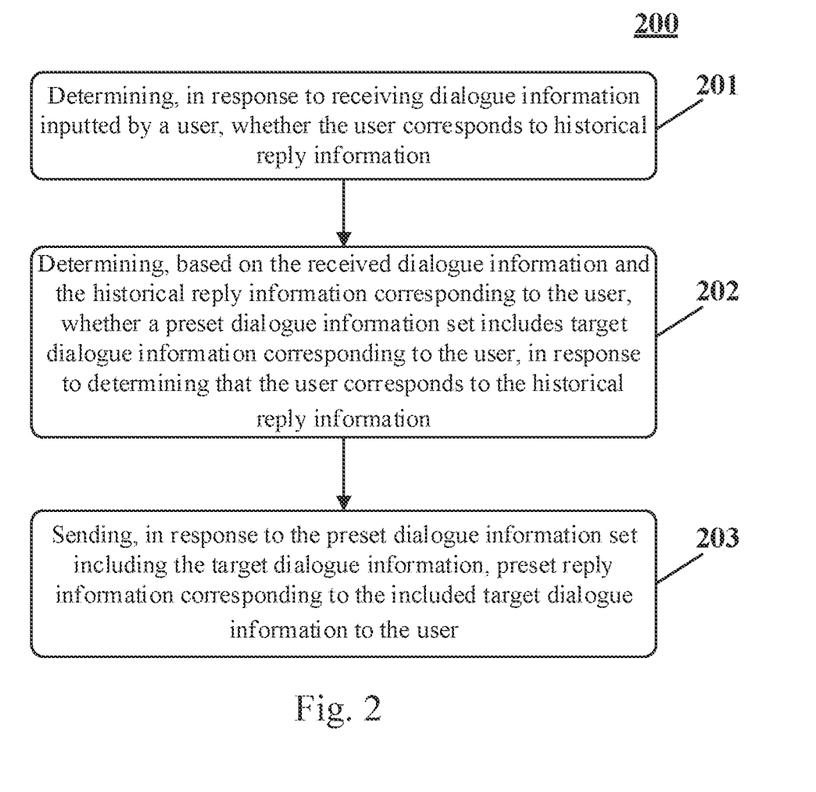
FIG. 2 is a flowchart of a method for processing information according to an embodiment of the present disclosure.

Further referring to FIG. 2, FIG. 2 illustrates a flow 200 of an embodiment of a method for processing information according to the present disclosure. The method for processing information includes the following steps.

Step 201, determining, in response to receiving dialogue information inputted by a user, whether the user corresponds to historical reply information.

In this embodiment, an executing body (e.g., the server or the terminal devices shown in FIG. 1) of the method for processing information may determine whether the user corresponds to the historical reply information, in response to receiving, remotely or locally by means of a wired connection or a wireless connection, the dialogue information inputted by the user. Here, the historical reply information refers to a historical reply to historical dialogue information of the user. The historical dialogue information refers to dialogue information inputted by the user before the dialogue information currently inputted by the user is received.

In some alternative implementations of this embodiment, the historical reply information may be used to reply to a previous round of historical dialogue information relative to a current round of dialogue information. Here, the current round of dialogue information is the currently received dialogue information. Accordingly, the historical reply information is the information outputted most recently and used to reply to the user. It may be understood that, during a dialogue, the dialogue information and the reply information that are adjacent are usually associated. Therefore, in this implementation, the latest historical reply information outputted to the user as a reference for the reply to the dialogue information currently inputted by the user, which helps to determine the premise and background of the dialogue information currently inputted by the user, and then helps to reply to the user more effectively. As an example, the historical reply information corresponding to the user may be "recommend restaurant A and restaurant B to you," and the currently received dialogue information may be "what special dishes does restaurant A have."

In this embodiment, the above dialogue information (including the currently received dialogue information and the historical dialogue information) may be various information inputted by the user and used for a dialogue with a machine, the various information including, but not limited to, at least one of: text information, voice information, image information or video information. The reply information may be various information used to reply to the dialogue information, the various information including, but not limited to, at least one of: text information, voice information, image information or video information. As an example, the dialogue information may be the voice "what good restaurants are around," and the corresponding reply information may be the voice "recommend restaurant A and restaurant B to you."

It can be understood that the process in which the user inputs the dialogue information and the above executing body feeds back the corresponding reply information to the user is the process of a human-machine dialogue.

Specifically, the above executing body may record the dialogue with the user, and thus, the above executing body may determine whether the above user corresponds to the historical reply information through the dialogue record. Alternatively, the above executing body may use a user tag (e.g., a user ID) of the user as a key, and use latest reply information outputted to the user as a value, to store the user tag and the latest reply information corresponding to the user into a database in the form of a key-value pair. Moreover, the above executing body may further replace the reply information corresponding to the user and stored in the database using the newest reply information every time a new dialogue with the user is generated. Accordingly, here, the executing body may determine whether the user corresponds to the historical reply information, by determining whether the database includes the user tag of the user.

Step 202, determining, based on the received dialogue information and the historical reply information corresponding to the user, whether a preset dialogue information set includes target dialogue information corresponding to the user, in response to determining that the user corresponds to the historical reply information.

In this embodiment, in response to determining that the user corresponds to the historical reply information, the executing body may determine whether the preset dialogue information set includes the target dialogue information corresponding to the user, based on the received dialogue information and the historical reply information corresponding to the user. Here, preset dialogue information corresponds to preset reply information and preset historical reply information. The preset reply information is used to reply to the corresponding preset dialogue information, and the preset historical reply information is used to reply to historical dialogue information relative to the corresponding preset dialogue information. That is, the preset historical reply information refers to information that is generated before the corresponding preset dialogue information and used to reply to the dialogue information. As an example, the preset dialogue information may be "how much is the ticket to scenic spot C," the preset historical reply information corresponding to the preset dialogue information may be "recommend scenic spot C and scenic spot D to you," and the preset reply information corresponding to the preset dialogue information may be "60 yuan per person." Here, the preset historical reply information "recommend scenic spot C and scenic spot D to you" may be the information used to reply to the dialogue information "What are the good scenic spots in city M," and it is not difficult to understand that the dialogue information "What are the good scenic spots in city M" is the dialogue information generated before the preset dialogue information "how much is the ticket to scenic spot C", that is, the historical dialogue information relative to the preset dialogue information "how much is the ticket to scenic spot C."

It should be noted that the preset dialogue information and the preset reply information and the preset historical reply information that correspond to the preset dialogue information are predetermined corpora used for dialogues with the user. In practice, the executing body may collect the generated dialogue information and reply information when conducting a dialogue with the user based on the corpus, and use the collected dialogue information and reply information as the corpora for subsequent dialogues. Accordingly, the corpora used for the dialogue with the user can be made more abundant, which helps to improve the diversity of the human-computer dialogue.

In this embodiment, the target dialogue information is preset dialogue information which matches the received dialogue information and of which corresponding preset historical reply information matches the historical reply information corresponding to the user. Here, the matching may mean being similar or identical. When the matching means being similar, two pieces of information having a similarity greater than or equal to a preset threshold may be referred to as similar information (i.e., matching information). Here, the preset threshold may be a numerical value predetermined by a technician. As an example, the preset threshold may be 0.85 (the value of the similarity ranges from 0 to 1).

Specifically, the executing body may adopt various methods to determine whether the preset dialogue information set includes the target dialogue information corresponding to the user.

In some alternative implementations of this embodiment, the executing body may first determine whether the preset dialogue information set includes candidate dialogue information matching the received dialogue information. Here, the candidate dialogue information is the preset dialogue information matching the received dialogue information. Then, in response to determining that the preset dialogue information set includes the candidate dialogue information matching the received dialogue information, the executing body may determine whether the included candidate dialogue information includes the target dialogue information of which the corresponding preset historical reply information matches the historical reply information corresponding to the user.

In this implementation, the target dialogue information may be determined through a stepwise screening approach. That is, the candidate dialogue information is first determined based on the matching of the dialogue information, and then, the target dialogue information is determined from the candidate dialogue information based on the matching of the historical reply information. As compared with the direct search for the preset dialogue information in the preset dialogue information set, the preset dialogue information satisfying the matching of the dialogue information and the matching of the historical reply information at the same time, this implementation may reduce the workload of determining the target dialogue information, which helps to reduce the resource consumption in the process of replying to the user, and thus, the efficiency of replying to the user is improved.

In some alternative implementations of this embodiment, the executing body may further determine, in response to determining that the user does not correspond to the historical reply information, whether the preset dialogue information set includes the candidate dialogue information matching the received dialogue information, and send, in response to the preset dialogue information set including candidate dialogue information corresponding to the user, preset reply information corresponding to the included candidate dialogue information to the user.

Step 203, sending, in response to the preset dialogue information set including the target dialogue information, preset reply information corresponding to the included target dialogue information to the user.

In this embodiment, in response to the preset dialogue information set including the target dialogue information corresponding to the user, the executing body may send the preset reply information corresponding to the included target dialogue information to the user.

Specifically, if the executing body directly interacts with the user, the executing body may directly output the preset reply information corresponding to the target dialogue information. If the executing body interacts with the user through a user terminal, the executing body may send the preset reply information corresponding to the target dialogue information to the user terminal used by the user, such that the user terminal outputs the received preset reply information to the user.

In some alternative implementations of this embodiment, in response to that the preset dialogue information set does not include the target dialogue information corresponding to the user, the executing body may further send preset general reply information to the user. Here, the preset general reply information is a preset response to the user when the preset reply information for replying to the user cannot be found from a preset corpora. As an example, the preset general reply information may be "sorry, I haven't learned how to answer this question, or you can transfer to the manual service."

In some alternative implementations of this embodiment, in response to the preset dialogue information set including at least two pieces of target dialogue information corresponding to the user, the executing body may further send preset reply information corresponding to target dialogue information most matching the received dialogue information in the included at least two pieces of target dialogue information to the user. Here, the most matching target dialogue information may be the target dialogue information having a highest similarity to the received dialogue information, or may be the target dialogue information of which the corresponding preset historical reply information has a highest similarity to the historical reply information corresponding to the user. Alternatively, the most matching target dialogue information may be the target dialogue information for which the mean value of a similarity between dialogue information (the target dialogue information and the received dialogue information) and a similarity between historical reply information (the preset historical reply information corresponding to the target dialogue information and the historical reply information corresponding to the user) is maximum.

Figure 3:
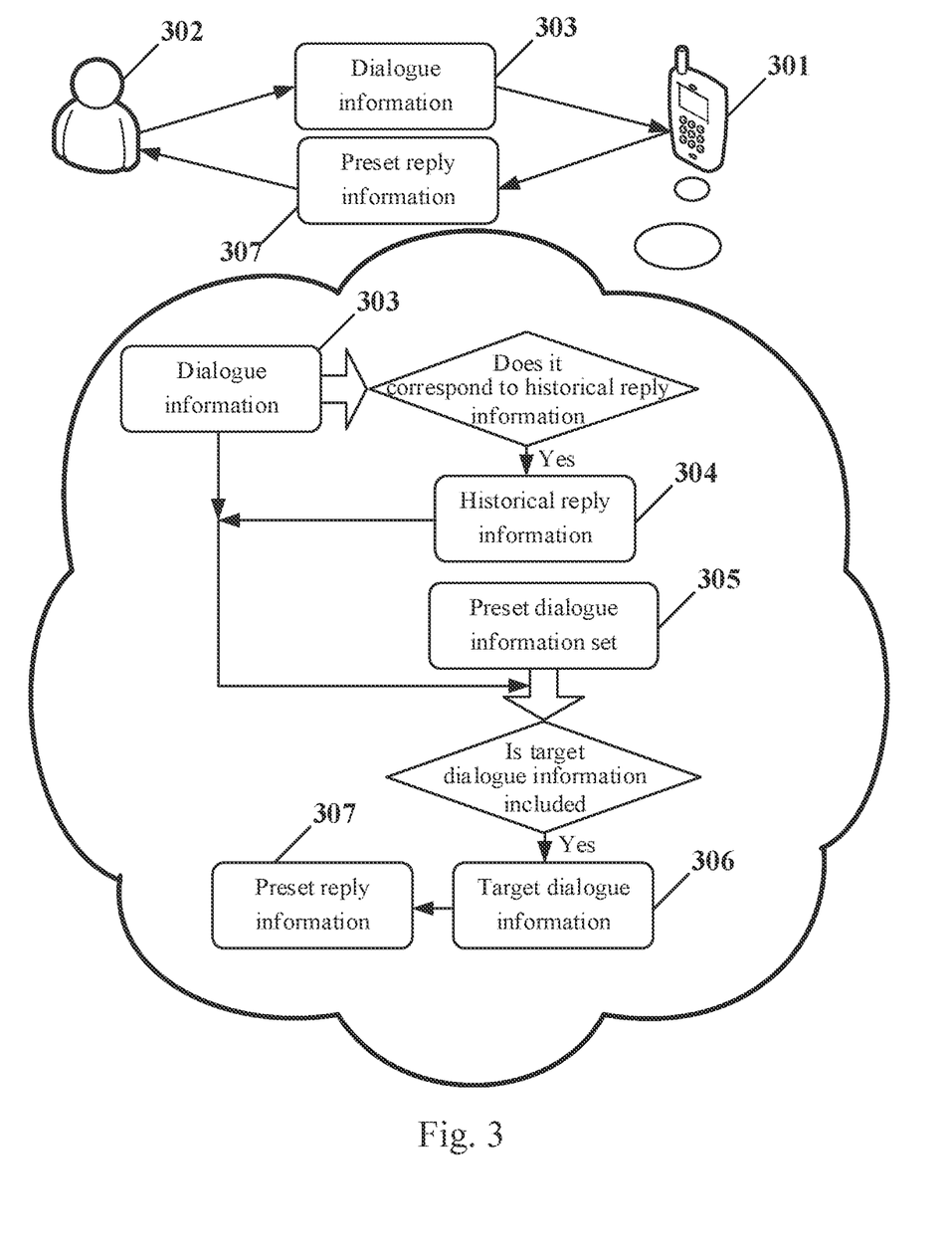
FIG. 3 is a schematic diagram of an application scenario of a method for processing information according to an embodiment of the present disclosure.

Further referring to FIG. 3, FIG. 3 is a schematic diagram of an application scenario of the method for processing information according to this embodiment.

In the application scenario of FIG. 3, first, a mobile phone 301 may determine, in response to receiving dialogue information 303 (e.g., "what are the characteristics of restaurant A") inputted by a user 302, whether the user 302 corresponds to historical reply information. Here, the historical reply information refers to a historical reply to historical dialogue information of the user 302.

Then, in response to determining that the user 302 corresponds to the historical reply information 304 (e.g., "here recommend good restaurants A and B to you," and as an example, "here recommend good restaurants A and B to you" may be the reply to the historical dialogue information of the user "please help to recommend restaurants in city A"), the mobile phone 301 may determine whether a preset dialogue information set 305 includes target dialogue information corresponding to the user 302, based on the received dialogue information 303 and the historical reply information 304 corresponding to the user 302. Here, preset dialogue information corresponds to preset reply information and preset historical reply information. The preset reply information is used to reply to the corresponding preset dialogue information, and the preset historical reply information is used to reply to historical dialogue information relative to the corresponding preset dialogue information. The target dialogue information is preset dialogue information which matches the received dialogue information 303 and of which corresponding preset historical reply information matches the historical reply information 304 corresponding to the user 302.

Next, in response to the preset dialogue information set 305 including the target dialogue information 306 (e.g., "what special dishes does restaurant A have") corresponding to the user 302, the mobile phone 301 may send preset reply information 307 (e.g., "Fried Pork in Scoop") corresponding to the included target dialogue information 306 to the user 302.

According to the method provided in the above embodiment of the present disclosure, at the time of replying to the dialogue information currently inputted by the user, the historical reply information sent to the user during a historical dialogue may be used as a reference factor, and then, the dialogue information currently inputted by the user and the background in which the dialogue information is inputted by the user may be comprehensively taken into consideration. Thus, the reply to the user can be more accurately and effectively, which helps to improve the accuracy and effectiveness of the human-machine dialogue.

Figure 4:
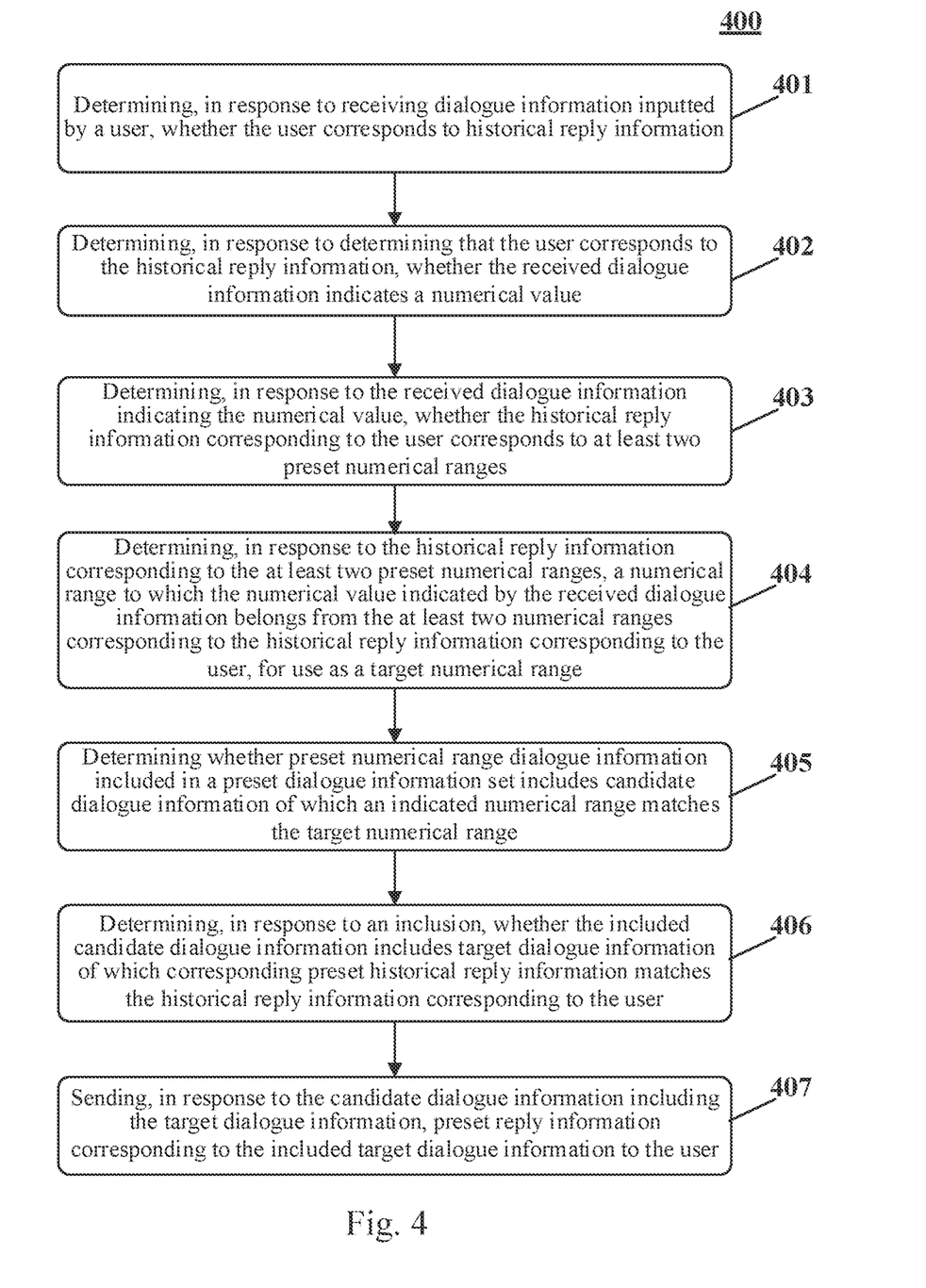
FIG. 4 is a flowchart of the method for processing information according to another embodiment of the present disclosure.

Further referring to FIG. 4, FIG. 4 illustrates a flow 400 of another embodiment of a method for processing information. The flow 400 of the method for processing information includes the following steps.

Step 401, determining, in response to receiving dialogue information inputted by a user, whether the user corresponds to historical reply information.

In this embodiment, an executing body (e.g., the server or the terminal devices shown in FIG. 1) of the method for processing information may determine whether the user corresponds to the historical reply information, in response to receiving, remotely or locally by means of a wired connection or a wireless connection, the dialogue information inputted by the user. Here, the historical reply information refers to a historical reply to historical dialogue information of the user. The historical dialogue information refers to dialogue information inputted by the user before the dialogue information currently inputted by the user is received.

Step 402, determining, in response to determining that the user corresponds to the historical reply information, whether the received dialogue information indicates a numerical value.

In this embodiment, in response to determining that the user corresponds to the historical reply information, the executing body may determine whether the dialogue information received in step 401 indicates the numerical value.

As an example, if the received dialogue information may be "170 cm in height," the dialogue information may indicate the numerical value 170. Alternatively, if the received dialogue information may be "I am 21 years old this year," the dialogue information may indicate the numerical value "21."

Step 403, determining, in response to the received dialogue information indicating the numerical value, whether the historical reply information corresponding to the user corresponds to at least two preset numerical ranges.

In this embodiment, in response to the received dialogue information indicating the numerical value, the executing body may determine whether the historical reply information corresponding to the user corresponds to the at least two preset numerical ranges.

It may be understood that, in practice, the reply information used to reply to the user is preset information. For the reply information used to acquire the feature value of the specific feature (e.g., a height feature and an age feature) inputted by the user, a technician may also preset at least two numerical ranges for the reply information, such that, after the user inputs a different feature value, different reply information is selected for the numerical range to which the feature value belongs, to make a reply. It should be noted that, the at least two numerical ranges preset for the reply information may be at least two mutually exclusive numerical ranges.

As an example, the historical reply information may be "what is your height." For this historical reply information, three numerical ranges (i.e., at least two numerical ranges) may be preset, which are respectively "[150,160]; [160, 170]; [170,180]." Then, when the user inputs the dialogue information "I am 165 in height," the reply information "recommend you to choose size M" corresponding to [160, 170] may be selected to be outputted to the user. When the user inputs the dialogue information "I am 155 in height," the reply information "recommend you to choose size S" corresponding to [150,160] may be selected to be outputted to the user. When the user inputs the dialogue information "I am 175 in height," the reply information "recommend you to choose size L" corresponding to [170,180] may be selected to be outputted to the user.

It should be noted that the whole process of replying to the dialogue information inputted by the user and used to indicate the numerical value is exemplarily given here, and the specifical content such as how to make the dialogue information and the numerical range corresponding to each other and how to determine the reply information corresponding to the corresponding numerical range will be described in detail in subsequent steps.

Step 404, determining, in response to the historical reply information corresponding to the at least two preset numerical ranges, a numerical range to which the numerical value indicated by the received dialogue information belongs from the at least two numerical ranges corresponding to the historical reply information corresponding to the user, for use as a target numerical range.

In this embodiment, in response to the historical reply information corresponding to the at least two preset numerical ranges, the executing body may determine the numerical range to which the numerical value indicated by the received dialogue information belongs from the at least two numerical ranges corresponding to the historical reply information corresponding to the user, for use as the target numerical range. Further referring to the above example, the dialogue information inputted by the user may be "I am 155 in height," and the historical reply information "what is your height" may correspond to three numerical ranges, which are respectively "[150,160]; [160,170]; [170,180]." Since the numerical value 155 indicated by the dialogue information "I am 155 in height" belongs to the numerical range [150, 160], the numerical range [150,160] may be determined as the target numerical range.

In practice, the reply information and the at least two numerical ranges corresponding to the reply information are usually associated and stored. Here, the numerical ranges may be stored in various forms, for example, in the form of a graph or in the form of a Boolean expression. It may be understood that, when the numerical ranges are stored in the form of the Boolean expression, the target numerical range is a numerical range corresponding to the Boolean expression that is true, after the numerical value indicated by the dialogue information is substituted into the Boolean expression.

Step 405, determining whether preset numerical range dialogue information included in a preset dialogue information set includes candidate dialogue information of which an indicated numerical range matches the target numerical range.

In this embodiment, the preset dialogue information set includes the preset numerical range dialogue information, and the preset numerical range dialogue information is used to indicate a numerical range. Preset historical reply information corresponding to the preset numerical range dialogue information corresponds to the at least two preset numerical ranges. The numerical range indicated by the preset numerical range dialogue information belongs to the at least two numerical ranges corresponding to the corresponding preset historical reply information. Then, based on the target numerical range obtained in step 404, the executing body may determine whether the preset numerical range dialogue information included in the preset dialogue information set includes the candidate dialogue information of which the indicated numerical range matches the target numerical range.

In this embodiment, the preset numerical range dialogue information may be various information used to indicate a numerical range, the various information including, but not limited to, at least one of: a word, a number, a symbol, an image, an audio or a video.

Step 406, determining, in response to that the preset numerical range dialogue information included in a preset dialogue information set includes candidate dialogue information of which an indicated numerical range matches the target numerical range, whether the included candidate dialogue information includes target dialogue information of which corresponding preset historical reply information matches the historical reply information corresponding to the user.

In this embodiment, in response to determining that the preset numerical range dialogue information included in the preset dialogue information set includes the candidate dialogue information of which the indicated numerical range matching the target numerical range, the executing body may determine whether the included candidate dialogue information includes the target dialogue information of which the corresponding preset historical reply information matches the historical reply information corresponding to the user.

Further referring to the above example, the target numerical range is [150,160]. The preset dialogue information may include the preset numerical range dialogue information "the height is between 150 cm and 160 cm" and the preset numerical range dialogue information "the weight is between 75 kilograms and 80 kilograms." It can be seen that both the two pieces of preset numerical range dialogue information indicate the numerical range [150,160], which is the same as (i.e., matches) the target numerical range. Then the executing body may determine the two pieces of preset numerical range dialogue information as the candidate dialogue information. Moreover, the historical reply information corresponding to the user may be "what is your height," and the preset historical reply information corresponding to the determined candidate dialogue information "the height is between 150 cm and 160 cm" may be "what is your height." The preset historical reply information corresponding to the candidate dialogue information "the weight is between 75 kilograms and 80 kilograms" may be "what is your weight." Since the preset historical reply information corresponding to the candidate dialogue information "the height is between 150 cm and 160 cm" is the same as (i.e., matches) the historical reply information corresponding to the user, the executing body may determine that the candidate dialogue information includes the target dialogue information (i.e., "the height is between 150 cm and 160 cm") of which the corresponding preset historical reply information matches the historical reply information corresponding to the user.

It may be understood that, when the dialogue information of the user indicates the numerical value, it is difficult to determine the target dialogue information based on the method in which the dialogue information is similar to or the same as the preset dialogue information. Specifically, on the one hand, when the preset dialogue information set is set, it is difficult to enumerate all numerical values that the user may input. On the other hand, even if the two pieces of dialogue information indicating the numerical values are similar in form, as long as the numerical values indicated by the two pieces of dialogue information are different, the actual meanings of the two pieces of dialogue information may be quite different. For example, for the dialogue information "I am 8 years old this year" and the dialogue information "I am 80 years old this year." Although the two pieces of dialogue information are similar, their actual meanings are far from each other. Therefore, this embodiment adopts the method in which the numerical value indicated by the received dialog information is represented as the target numerical range, and then the target dialog information is determined based on the matching of the numerical range, and thus, the effectiveness of the reply to the dialogue information inputted by the user and related to the numerical value cam be improved.

Step 407, sending, in response to the candidate dialogue information including the target dialogue information, preset reply information corresponding to the included target dialogue information to the user.

In this embodiment, in response to the candidate dialogue information including the target dialogue information of which the corresponding preset historical reply information matches the historical reply information corresponding to the user, the executing body may send the preset reply information corresponding to the included target dialogue information to the user.

The above steps 401 and 407 may be respectively performed in a way similar to the steps 201 and 203 in the foregoing embodiment. Thus, the above descriptions for the steps 201 and 203 are also applicable to the steps 401 and 407, and thus will not be repeatedly described herein.

It can be seen from FIG. 4 that, as compared with the embodiment corresponding to FIG. 2, the flow 400 of the method for processing information in this embodiment emphasizes the step in which the target dialogue information is matched from the preset dialogue information based on the target numerical range to which the numerical value indicated by the dialogue information belongs, in the situation where the dialogue information inputted by the user indicates the numerical value. Accordingly, the solution described in this embodiment can realize the reply to the dialogue information inputted by the user and related to the numerical value, thereby improving the applicability and diversity of the human-machine dialogue.

Figure 5:
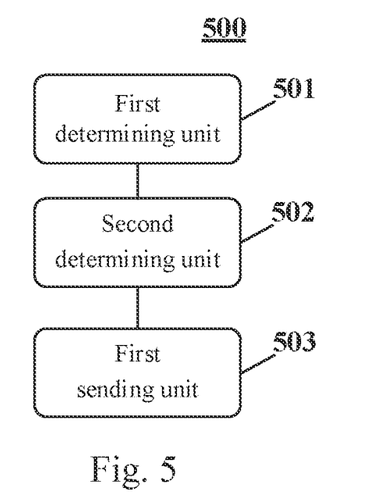
FIG. 5 is a schematic structural diagram of an apparatus for processing information according to an embodiment of the present disclosure.

Further referring to FIG. 5, as an implementation of the method shown in the above drawings, an embodiment of the present disclosure provides an apparatus for processing information. The embodiment of the apparatus corresponds to the embodiment of the method shown in FIG. 2. The apparatus may be applied in various electronic devices.

As shown in FIG. 5, the apparatus 500 for processing information in this embodiment includes: a first determining unit 501, a second determining unit 502 and a first sending unit 503. Here, the first determining unit 501 is configured to determine, in response to receiving dialogue information inputted by a user, whether the user corresponds to historical reply information. Here, the historical reply information refers to a historical reply to historical dialogue information of the user. The second determining unit 502 is configured to determine, based on the received dialogue information and the historical reply information corresponding to the user, whether a preset dialogue information set includes target dialogue information corresponding to the user, in response to determining that the user corresponds to the historical reply information. Here, preset dialogue information corresponds to preset reply information and preset historical reply information, the preset reply information is used to reply to the corresponding preset dialogue information, the preset historical reply information is used to reply to historical dialogue information relative to the corresponding preset dialogue information, and the target dialogue information is preset dialogue information which matches the received dialogue information and of which corresponding preset historical reply information matches the historical reply information corresponding to the user. The first sending unit 503 is configured to send, in response to the preset dialogue information set including the target dialogue information, preset reply information corresponding to the included target dialogue information to the user.

In this embodiment, the first determining unit 501 in the apparatus 500 for processing information may determine whether the user corresponds to the historical reply information, in response to receiving, remotely or locally by means of a wired connection or a wireless connection, the dialogue information inputted by the user. Here, the historical reply information refers to a historical reply to historical dialogue information of the user. The historical dialogue information refers to dialogue information inputted by the user before the dialogue information currently inputted by the user is received.

In this embodiment, in response to determining that the user corresponds to the historical reply information, the second determining unit 502 may determine whether the preset dialogue information set includes the target dialogue information corresponding to the user, based on the received dialogue information and the historical reply information corresponding to the user. Here, the preset dialogue information corresponds to the preset reply information and the preset historical reply information. The preset reply information is used to reply to the corresponding preset dialogue information, and the preset historical reply information is used to reply to the historical dialogue information relative to the corresponding preset dialogue information. That is, the preset historical reply information refers to information that is generated before the corresponding preset dialogue information and used to reply to the dialogue information.

In this embodiment, the target dialogue information is the preset dialogue information which matches the received dialogue information and of which the corresponding preset historical reply information matches the historical reply information corresponding to the user. Here, the matching may mean being similar or identical.

In this embodiment, the first sending unit 503 may send the preset reply information corresponding to the included target dialogue information to the user, in response to the preset dialogue information set including the target dialogue information corresponding to the user.

In some alternative implementations of this embodiment, the second determining unit 502 may include: a first determining module (not shown in the figure), configured to determine whether the preset dialogue information set includes candidate dialogue information matching the received dialogue information; and a second determining module (not shown in the figure), configured to determine, in response to that the preset dialogue information set includes candidate dialogue information matching the received dialogue information, whether the included candidate dialogue information includes the target dialogue information of which the corresponding preset historical reply information matches the historical reply information corresponding to the user.

In some alternative implementations of this embodiment, the preset dialogue information set includes preset numerical range dialogue information, the preset numerical range dialogue information is used to indicate a numerical range, preset historical reply information corresponding to the preset numerical range dialogue information corresponds to at least two preset numerical ranges, and the numerical range indicated by the preset numerical range dialogue information belongs to the at least two numerical ranges corresponding to the corresponding preset historical reply information. The second determining unit 502 may include: a third determining module (not shown in the figure), configured to determine whether the received dialogue information indicates a numerical value; a fourth determining module (not shown in the figure), configured to determine, in response to the received dialogue information indicating the numerical value, whether the historical reply information corresponding to the user corresponds to the at least two preset numerical ranges; a fifth determining module (not shown in the figure), configured to determine, in response to the historical reply information corresponding to the at least two preset numerical ranges, a numerical range to which the numerical value indicated by the received dialogue information belongs from the at least two numerical ranges corresponding to the historical reply information corresponding to the user, for use as a target numerical range; a sixth determining module (not shown in the figure), configured to determine whether the preset numerical range dialogue information included in the preset dialogue information set includes candidate dialogue information of which an indicated numerical range matches the target numerical range; and a seventh determining module (not shown in the figure), configured to determine, in response to that the preset numerical range dialogue information included in the preset dialogue information set includes candidate dialogue information of which an indicated numerical range matches the target numerical range, whether the included candidate dialogue information includes the target dialogue information of which the corresponding preset historical reply information matches the historical reply information corresponding to the user.

In some alternative implementations of this embodiment, the apparatus 500 may further include: a second sending unit (not shown in the figure), configured to send, in response to that the preset dialogue information set does not include the target dialogue information corresponding to the user, preset general reply information to the user.

In some alternative implementations of this embodiment, the first sending unit 503 may be further configured to send, in response to the preset dialogue information set including at least two pieces of target dialogue information corresponding to the user, preset reply information corresponding to target dialogue information most matching the received dialogue information in the included at least two pieces of target dialogue information to the user.

In some alternative implementations of this embodiment, the apparatus 500 may further include: a third determining unit (not shown in the figure), configured to determine, in response to determining that the user does not correspond to the historical reply information, whether the preset dialogue information set includes the candidate dialogue information matching the received dialogue information, and a third sending unit (not shown in the figure), configured to send, in response to the preset dialogue information set including candidate dialogue information corresponding to the user, preset reply information corresponding to the included candidate dialogue information to the user.

In some alternative implementations of this embodiment, the historical reply information is a reply to a previous round of historical dialogue information relative to a current round of dialogue information.

It may be understood that the units in the apparatus 500 correspond to the steps in the method described with reference to FIG. 2. Therefore, the above operations and features described for the method and the beneficial effects thereof are also applicable to the apparatus 500 and the units included therein, and thus will not be repeatedly described herein.

According to the apparatus 500 provided in the above embodiment of the present disclosure, at the time of replying to the dialogue information currently inputted by the user, the historical reply information sent to the user during a historical dialogue may be used as a reference factor, and then, the dialogue information currently inputted by the user and the background in which the dialogue information is inputted by the user may be comprehensively taken into consideration. Thus, the reply to the user can be more accurately and effectively, which helps to improve the accuracy and effectiveness of the human-machine dialogue.

Figure 6:
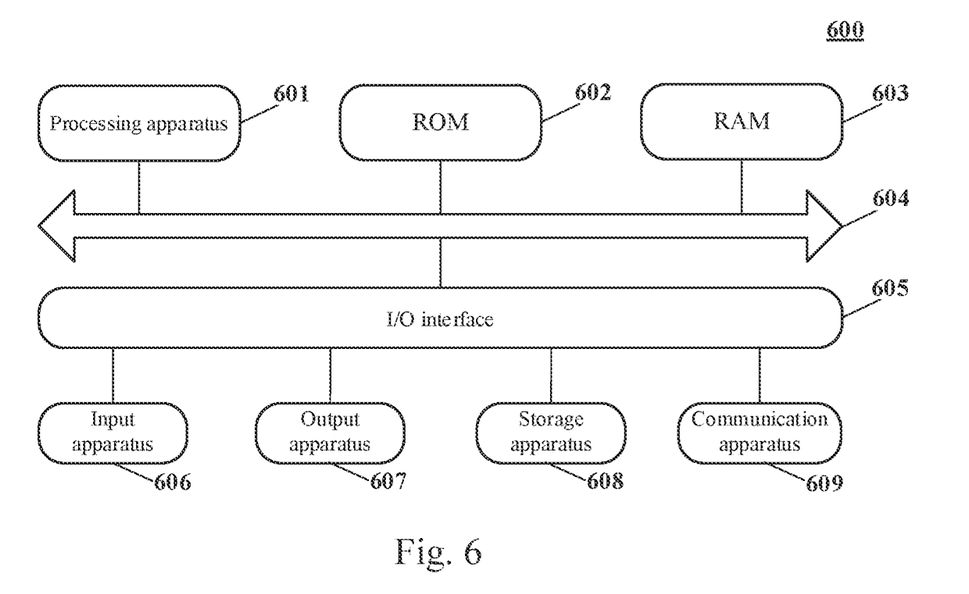
FIG. 6 is a schematic structural diagram of a computer system of an electronic device adapted to implement embodiments of the present disclosure.

Referring to FIG. 6, FIG. 6 is a schematic structural diagram of an electronic device (e.g., the terminal devices or server shown in FIG. 1) 600 adapted to implement embodiments of the present disclosure. The terminal devices in the embodiments of the present disclosure may include, but not limited to, mobile terminals such as a mobile phone, a notebook computer, a digital broadcast receiver, a PDA (personal digital assistant), a PAD (tablet computer), a PMP (portable multimedia player) and a vehicle-mounted terminal (e.g., a vehicle-mounted navigation terminal), and fixed terminals such as a digital TV and a desktop computer. The electronic device shown in FIG. 6 is merely an example, and should not bring any limitation to the functions and the scope of use of the embodiments of the present disclosure.

As shown in FIG. 6, the electronic device 600 includes a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 further stores various programs and data required by the operations of the electronic device 600. The processing apparatus 601, the ROM 602 and the RAM 603 are connected to each other through a bus 604. An input/output (I/O) interface 605 is also connected to the bus 604.

Generally, the following apparatus may be connected to the I/O interface 605: an input apparatus 606 including a touch screen, a touchpad, a keyboard, a mouse, a camera, a microphone, an accelerometer, a gyroscope, or the like; an output apparatus 607 including a liquid crystal display (LCD), a speaker, a vibrator, or the like; a storage apparatus 608 including, for example, a magnetic tape, a hard disk, or the like; and a communication apparatus 609. The Communication apparatus 609 may allow electronic device 600 to wirelessly or wirelessly communicate with other devices to exchange data. Although FIG. 6 illustrates an electronic device 600 having various devices, it should be understood that not all apparatus are required to be implemented or shown. More or fewer devices may alternatively be implemented or provided.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above-mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: determine, in response to receiving dialogue information inputted by a user, whether the user corresponds to historical reply information, the historical reply information referring to a historical reply to historical dialogue information of the user; determine, based on the received dialogue information and the historical reply information corresponding to the user, whether a preset dialogue information set includes target dialogue information corresponding to the user, in response to determining that the user corresponds to the historical reply information, wherein preset dialogue information corresponds to preset reply information and preset historical reply information, the preset reply information is used to reply to the corresponding preset dialogue information, the preset historical reply information is used to reply to historical dialogue information relative to the corresponding preset dialogue information, and the target dialogue information is preset dialogue information which matches the received dialogue information and of which corresponding preset historical reply information matches the historical reply information corresponding to the user; and send, in response to the preset dialogue information set including the target dialogue information corresponding to the user, preset reply information corresponding to the included target dialogue information to the user.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. Here, the names of these units do not in some cases constitute a limitation to such units themselves. For example, the first sending unit may alternatively be described as "a unit for sending reply information."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing information, wherein the method is performed by a hardware processor and comprises:
   determining with the hardware processor, in response to receiving first dialogue information inputted by a user using a terminal device, whether the user corresponds to historical reply information,
      wherein the historical reply information refers to information used to reply to historical dialogue information of the user,
      wherein the historical dialogue information refers to previous dialogue information inputted by the user before the first dialogue information inputted by the user is received,
      wherein a user tag and the historical reply information are stored in a database in a form of a key-value pair, with a key of the key-value pair referring to the user tag and a value of the key-value pair referring to the historical reply information,
      wherein the database is stored in a memory readable by the hardware processor, and
      wherein the determining whether the user corresponds to the historical reply information comprises determining with the hardware processor based on the key-value pair whether the user tag of the user is included in the database;
   determining with the hardware processor target dialogue information through a stepwise screening approach comprising:
      searching a preset dialogue information set to determine whether the preset dialogue information set comprises candidate dialogue information matching the first dialogue information, wherein preset dialogue information in the preset dialogue information set corresponds to preset reply information, determining whether preset historical reply information corresponding to the candidate dialogue information matches the historical reply information corresponding to the user, and determining, in response to the preset historical reply information matching the historical reply information corresponding to the user, that the candidate dialogue information is the target dialogue information, wherein the preset historical reply information refers to information used to reply to the preset historical dialogue information generated before the preset dialogue information;

determining with the hardware processor whether the target dialogue information corresponds to the user based on the first dialogue information and the historical reply information corresponding to the user, wherein the determining is performed by:

determining with the hardware processor that the target dialogue information in the preset dialogue information set matches the first dialogue information, and determining with the hardware processor that the preset historical reply information corresponding to the target dialogue information matches the historical reply information corresponding to the user; and sending the preset reply information corresponding to the target dialogue information to the terminal device;

wherein the method further comprises:

determining whether a second dialogue with the user is generated, and responsive to determining that the second dialogue with the user is generated, replacing the historical reply information corresponding to the user and stored in the database with second reply information corresponding to the second dialogue.

2. The method according to claim 1, wherein the preset dialogue information set includes preset numerical range dialogue information, the preset numerical range dialogue information is used to indicate a numerical range, the preset historical reply information corresponding to the preset numerical range dialogue information corresponds to at least two preset numerical ranges, and the numerical range indicated by the preset numerical range dialogue information belongs to the at least two numerical ranges corresponding to the corresponding preset historical reply information, and determining, based on the first dialogue information and the historical reply information corresponding to the user, whether the preset dialogue information set includes the target dialogue information corresponding to the user comprises:

determining whether the first dialogue information indicates a numerical value;

determining, in response to the first dialogue information indicating the numerical value, whether the historical reply information corresponding to the user corresponds to the at least two preset numerical ranges;

determining, in response to the historical reply information corresponding to the at least two preset numerical ranges, a numerical range to which the numerical value indicated by the first dialogue information belongs from the at least two numerical ranges corresponding to the historical reply information corresponding to the user, for use as a target numerical range;

determining whether the preset numerical range dialogue information included in the preset dialogue information set includes the candidate dialogue information of which an indicated numerical range matches the target numerical range; and determining, in response to that the preset numerical range dialogue information included in the preset dialogue information set includes the candidate dialogue information of which the indicated numerical range matches the target numerical range, whether the included candidate dialogue information includes the target dialogue information of which the corresponding preset historical reply information matches the historical reply information corresponding to the user.

3. The method according to claim 1, further comprising:

sending, in response to that the preset dialogue information set does not include the target dialogue information corresponding to the user, preset general reply information to the user.

4. The method according to claim 1, wherein the sending the preset reply information corresponding to the target dialogue information to the terminal device comprises:

sending, in response to the preset dialogue information set including at least two pieces of target dialogue information corresponding to the user, the preset reply information corresponding to a piece of target dialogue information most matching the first dialogue information among the at least two pieces of target dialogue information to the terminal device.

5. The method according to claim 1, further comprising:

determining, in response to determining that the user does not correspond to the historical reply information, whether the preset dialogue information set includes the candidate dialogue information matching the first dialogue information, and sending, in response to the preset dialogue information set including the candidate dialogue information corresponding to the user, the preset reply information corresponding to the included candidate dialogue information to the user.

6. The method according to claim 1, wherein the historical reply information is a historical reply to a previous round of historical dialogue information relative to a current round of dialogue information.

7. An electronic device, comprising:

one or more processors; and a storage apparatus, configured to store one or more programs, wherein the one or more programs, when executed by the one or more processors, cause the one or more processors to perform operations, the operations comprising:

determining with the one or more processors, in response to receiving first dialogue information inputted by a user using a terminal device, whether the user corresponds to historical reply information, wherein the historical reply information refers to information used to reply to historical dialogue information of the user, wherein the historical dialogue information refers to previous dialogue information inputted by the user before the first dialogue information inputted by the user is received, wherein a user tag and the historical reply information are stored in a database in a form of a key-value pair, with a key of the key-value pair referring to the user tag and a value of the key-value pair referring to the historical reply information, wherein the database is stored in a memory readable by the hardware processor, and wherein the determining whether the user corresponds to the historical reply information comprises determining with the hardware processor based on the key-value pair whether the user tag of the user is included in the database;
determining with the hardware processor target dialogue information through a stepwise screening approach comprising:
searching a preset dialogue information set to determine whether the preset dialogue information set comprises candidate dialogue information matching the first dialogue information, wherein preset dialogue information in the preset dialogue information set corresponds to preset reply information,
determining whether preset historical reply information corresponding to the candidate dialogue information matches the historical reply information corresponding to the user, and
determining, in response to the preset historical reply information matching the historical reply information corresponding to the user, that the candidate dialogue information is the target dialogue information, wherein the preset historical reply information refers to information used to reply to the preset historical dialogue information generated before the preset dialogue information;
determining with the hardware processor whether the target dialogue information corresponds to the user based on the first dialogue information and the historical reply information corresponding to the user, wherein the determining is performed by:
determining with the hardware processor that the target dialogue information in the preset dialogue information set matches the first dialogue information, and
determining with the hardware processor that the preset historical reply information corresponding to the target dialogue information matches the historical reply information corresponding to the user; and
sending the preset reply information corresponding to the target dialogue information to the terminal device;
wherein the operations further comprise:
determining whether a second dialogue with the user is generated, and responsive to determining that the second dialogue with the user is generated, replacing the historical reply information corresponding to the user and stored in the database with second reply information corresponding to the second dialogue.

8. The electronic device according to claim 7, wherein the preset dialogue information set includes preset numerical range dialogue information, the preset numerical range dialogue information is used to indicate a numerical range, the preset historical reply information corresponding to the preset numerical range dialogue information corresponds to at least two preset numerical ranges, and the numerical range indicated by the preset numerical range dialogue information belongs to the at least two numerical ranges corresponding to the corresponding preset historical reply information, and
determining, based on the first dialogue information and the historical reply information corresponding to the user, whether the preset dialogue information set includes the target dialogue information corresponding to the user comprises:
determining whether the first dialogue information indicates a numerical value;
determining, in response to the first dialogue information indicating the numerical value, whether the historical reply information corresponding to the user corresponds to the at least two preset numerical ranges;
determining, in response to the historical reply information corresponding to the at least two preset numerical ranges, a numerical range to which the numerical value indicated by the first dialogue information belongs from the at least two numerical ranges corresponding to the historical reply information corresponding to the user, for use as a target numerical range;
determining whether the preset numerical range dialogue information included in the preset dialogue information set includes the candidate dialogue information of which an indicated numerical range matches the target numerical range; and
determining, in response to that the preset numerical range dialogue information included in the preset dialogue information set includes the candidate dialogue information of which the indicated numerical range matches the target numerical range, whether the included candidate dialogue information includes the target dialogue information of which the corresponding preset historical reply information matches the historical reply information corresponding to the user.

9. The electronic device according to claim 7, wherein the operations further comprise: sending, in response to that the preset dialogue information set does not include the target dialogue information corresponding to the user, preset general reply information to the user.

10. The electronic device according to claim 7, wherein the sending the preset reply information corresponding to the target dialogue information to the terminal device comprises: sending, in response to the preset dialogue information set including at least two pieces of target dialogue information corresponding to the user, the preset reply information corresponding to a piece of target dialogue information most matching the first dialogue information among the at least two pieces of target dialogue information to the terminal device.

11. The electronic device according to claim 7, wherein the operations further comprise: determining, in response to determining that the user does not correspond to the historical reply information, whether the preset dialogue information set includes the candidate dialogue information matching the first dialogue information, and
sending, in response to the preset dialogue information set including the candidate dialogue information corresponding to the user, the preset reply information corresponding to the included candidate dialogue information to the user.

12. The electronic device according to claim 7, wherein the historical reply information is a historical reply to a previous round of historical dialogue information relative to a current round of dialogue information.

13. A non-transitory computer readable medium, storing a computer program, wherein the program, when executed by a processor, causes the processor to perform operations, the operations comprising:
determining with the one or more processors, in response to receiving first dialogue information inputted by a user using a terminal device, whether the user corresponds to historical reply information,
wherein the historical reply information refers to information used to reply to historical dialogue information of the user, wherein the historical dialogue information refers to previous dialogue information inputted by the user before the first dialogue information inputted by the user is received, wherein a user tag and the historical reply information are stored in a database in a form of a key-value pair, with a key of the key-value pair referring to the user tag and a value of the key-value pair referring to the historical reply information, wherein the database is stored in a memory readable by the hardware processor, and wherein the determining whether the user corresponds to the historical reply information comprises determining with the hardware processor based on the key-value pair whether the user tag of the user is included in the database;

determining with the hardware processor target dialogue information through a stepwise screening approach comprising:

searching a preset dialogue information set to determine whether the preset dialogue information set comprises candidate dialogue information matching the first dialogue information, wherein preset dialogue information in the preset dialogue information set corresponds to preset reply information, determining whether preset historical reply information corresponding to the candidate dialogue information matches the historical reply information corresponding to the user, and determining, in response to the preset historical reply information matching the historical reply information corresponding to the user, that the candidate dialogue information is the target dialogue information, wherein the preset historical reply information refers to information used to reply to the preset historical dialogue information generated before the preset dialogue information;

determining with the hardware processor whether the target dialogue information corresponds to the user based on the first dialogue information and the historical reply information corresponding to the user, wherein the determining is performed by:

determining with the hardware processor that the target dialogue information in the preset dialogue information set matches the first dialogue information, and determining with the hardware processor that the preset historical reply information corresponding to the target dialogue information matches the historical reply information corresponding to the user; and sending the preset reply information corresponding to the target dialogue information to the terminal device;

wherein the operations further comprise:

determining whether a second dialogue with the user is generated, and responsive to determining that the second dialogue with the user is generated, replacing the historical reply information corresponding to the user and stored in the database with second reply information corresponding to the second dialogue.

14. The non-transitory computer readable medium according to claim 13, wherein the preset dialogue information set includes preset numerical range dialogue information, the preset numerical range dialogue information is used to indicate a numerical range, the preset historical reply information corresponding to the preset numerical range dialogue information corresponds to at least two preset numerical ranges, and the numerical range indicated by the preset numerical range dialogue information belongs to the at least two numerical ranges corresponding to the corresponding preset historical reply information, and determining, based on the first dialogue information and the historical reply information corresponding to the user, whether the preset dialogue information set includes the target dialogue information corresponding to the user comprises:

determining whether the first dialogue information indicates a numerical value;

determining, in response to the first dialogue information indicating the numerical value, whether the historical reply information corresponding to the user corresponds to the at least two preset numerical ranges;

determining, in response to the historical reply information corresponding to the at least two preset numerical ranges, a numerical range to which the numerical value indicated by the first dialogue information belongs from the at least two numerical ranges corresponding to the historical reply information corresponding to the user, for use as a target numerical range;

determining whether the preset numerical range dialogue information included in the preset dialogue information set includes the candidate dialogue information of which an indicated numerical range matches the target numerical range; and determining, in response to that the preset numerical range dialogue information included in the preset dialogue information set includes the candidate dialogue information of which the indicated numerical range matches the target numerical range, whether the included candidate dialogue information includes the target dialogue information of which the corresponding preset historical reply information matches the historical reply information corresponding to the user.

15. The non-transitory computer readable medium according to claim 13, wherein the operations further comprise: sending, in response to that the preset dialogue information set does not include the target dialogue information corresponding to the user, preset general reply information to the user.

16. The non-transitory computer readable medium according to claim 13, wherein the sending the preset reply information corresponding to the target dialogue information to the terminal device comprises:

sending, in response to the preset dialogue information set including at least two pieces of target dialogue information corresponding to the user, the preset reply information corresponding to a piece of target dialogue information most matching the first dialogue information among the at least two pieces of target dialogue information to the terminal device.

17. The non-transitory computer readable medium according to claim 13, wherein the operations further comprise: determining, in response to determining that the user does not correspond to the historical reply information, whether the preset dialogue information set includes the candidate dialogue information matching the first dialogue information, and sending, in response to the preset dialogue information set including the candidate dialogue information corresponding to the user, the preset reply information corresponding to the included candidate dialogue information to the user.

* * * * *